Oct. 10, 1961 T. H. STEARNS 3,004,229

HIGH FREQUENCY TRANSMISSION LINE

Filed Feb. 24, 1959 3 Sheets-Sheet 1

Thomas H. Stearns

*INVENTOR*

Oct. 10, 1961 T. H. STEARNS 3,004,229

HIGH FREQUENCY TRANSMISSION LINE

Filed Feb. 24, 1959 3 Sheets-Sheet 2

Thomas H. Stearns
*INVENTOR*

HIGH FREQUENCY TRANSMISSION LINE

Filed Feb. 24, 1959 3 Sheets-Sheet 3

Thomas H. Stearns
INVENTOR 3,004,229
Patented Oct. 10, 1961

3,004,229

HIGH FREQUENCY TRANSMISSION LINE

Thomas H. Stearns, South Merrimack, N.H., assignor to Sanders Associates, Inc., Nashua, N.H., a corporation of Delaware Filed Feb. 24, 1959, Ser. No. 795,146
7 Claims. (Cl. 333—84)

The present invention relates to transmission lines and more particularly to flexible high frequency transmission lines used in conjunction with high frequency electronic devices.

Prior art shielded high frequency transmission lines fall into three general categories—wave guides, coaxial lines and the so-called "flat-strip" lines. Because of their constructions each of these types of transmission lines have certain inherent deficiencies. Wave guides occupy a large amount of space, are generally rigid, are heavy, have a relatively narrow band pass characteristic and are expensive to manufacture. Coaxial transmission lines, on the other hand, are lighter, less expensive and are relatively flexible, but tend to be more leaky and more noisy than either of the other types. Furthermore, when a plurality of coaxial lines are packaged into a unit of high conductor density, much of their flexibility is lost. Probably the most undesirable feature of coaxial transmission lines, however, is their relatively high cost of manufacture as compared to strip line, the latter type transmission line being subject to manufacture by mass production, e.g., printed circuit, techniques.

Strip transmission lines, which are rather comprehensively described in the Handbook of Tri-Plate ® Microwave components, Sanders Associates, Inc., November 30, 1956, have many additional features. One of these features is that strip transmission lines allow the expression of design concepts that are impractical or even unattainable in conventional coaxial and wave guide systems. The most complex device can be manufactured in accordance with strip line techniques as easily as the simplest. The flat design of strip transmission lines, and components for use therewith, permits fabrication directly on the dielectric medium, which, as mentioned above, is characteristic of printed circuit techniques. In addition to greatly simplifying production of microwave components, the strip transmission lines and hardware for use therewith are unusually light in weight and tend to be extremely compact. Although strip transmission lines have many other desirable characteristics their more widespread use is somewhat limited due to their lack of flexibility. Even strip lines made with flexible thermoplastic, dielectric materials separating the inner conductor and ground planes are not useful as flexible transmission lines. Such laminates cannot be bent around a small radius because of lack of extensibility of the outer ground plane and buckling of the inner ground plane, that is to say, the ground plane on the inside of the arc. This buckling produces an impedance discontinuity which makes further use of the transmission line impractical.

It has been a problem in the past to vary the configuration of the conductors without substantially varying the characteristic impedance of the line. Variations of this character, however, normally do introduce variations in impedance or so-called impedance discontinuities. These discontinuities, in turn, tend to introduce undesired reflections and extraneous radiation losses. A good solution to the buckling problem from a mechanical standpoint is to make the ground planes from a plurality of separate segments of conductors spaced very closely together. Whereas this technique largely avoids conductor buckling and does provide a degree of flexibility, the use Sanders Associates, Inc. registered trademark.

of physical discontinuities in the ground planes, such as holes, slots or articulated pieces, introduces electric discontinuities in the transmission line as well as radiation losses. The present invention is directed to an improvement in such transmission lines by providing a solution for the problems arising from attempts to achieve a high degree of flexibility while eliminating the problems of radiation due to discontinuities caused by holes or openings of any kind in the material.

It is, therefore, an object of the present invention to provide an improved high-frequency transmission line.

It is a further object of this invention to provide an improved high-frequency transmission line exhibiting a high degree of flexibility.

An additional object of the present invention is to provide an improved flexible, high-frequency transmission line having substantially a constant characteristic impedance with minimum radiation losses.

Yet another object of this invention is to provide an improved flexible high-frequency transmission line having a plurality of closely spaced signal energy carrying conductors exhibiting minimal coupling between the adjacent conductors.

In accordance with the present invention, there is provided a flexible high-frequency transmission line. The line includes a pair of flexible, elongated, continuous, solid, extensible ground potential outer conductors. An elongated, flexible, extensible, signal-potential, inner conductor is disposed in insulated spaced relation between the outer conductors. The spacing between the conductors is periodically varied to provide increased flexibility while minimizing extraneous disturbances to the passage of electric energy introduced by flexing of the cable. Suitable means are provided for securing the conductors in their relative positions.

In accordance with another aspect of the invention, there is provided a flexible, electric cable. The cable includes an elongated matrix of flexible, elastic, insulating material. An elongated, flexible, partially non-linear, extensible conductor is embedded, at least in part, in the matrix. The embedded conductor part is sufficiently longer than the matrix between selected points along the cable to enable flexing of the cable by an extension of the conductor and a stretching of the elastic matrix to provide the flexible, electric cable.

Also in accordance with the present invention, there is provided a method of producing a flexible, high-frequency transmission line.

The method includes laminating an inner elongated flexible conductor for carrying signal energy between planar layers of insulating material. Each layer of insulating material is clad on the opposite face with a flexible, elongated, continuous, solid conductor in register with the inner conductor, to provide ground potential outer conductors. A plurality of indentations are impressed in each of the outer conductors to provide the flexible transmission line.

For a better understanding of the present invention, together with other and further objects thereof, reference is made to the following description, taken in connection with the accompanying drawings, and its scope will be pointed out in the appended claims.

Figure 1:
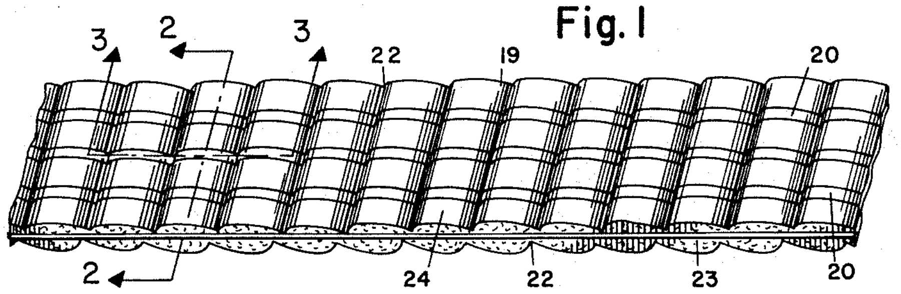
FIG. 1 is a perspective view of an embodiment of an electric cable or transmission line embodying the present invention.
Figure 2:
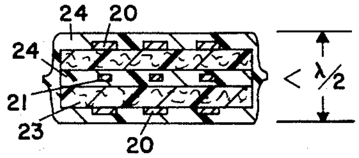
FIG. 2 is an elevational section taken along the line 2—2 of FIG. 1.
Figure 3:
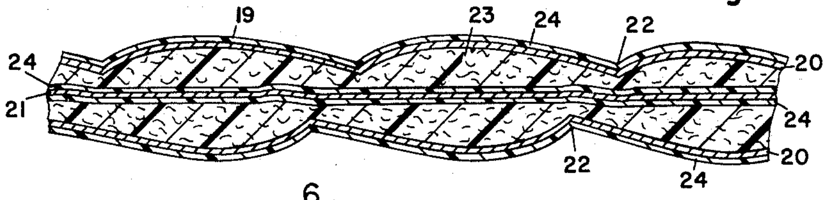
FIG. 3 is an elevational section of the high-frequency transmission line of FIG. 1 taken along the line 3—3.

Referring now to the drawings and with particular reference to FIGS. 1–3, there is here illustrated a flexible transmission line 19 embodying the present invention. The line has pairs of substantially parallel, flexible, elongated, planar, continuous, solid, extensible, outer conductors 20 providing ground planes. A plurality of elongated solid, planar, flexible, signal-potential, inner conductors 21 are disposed, as shown, between the outer conductors 20. The inner conductors 21 are narrower than the outer conductors 20 and each inner conductor 21 is preferably equally distant from its adjacent outer conductors 20. The spacing between the conductors is periodically varied by means of indentations 22 alternately in each of the outer conductors. These indentations 22 occur along lines falling in different planes laterally perpendicular to the cable or transmission line 19 to provide increased flexibility of the cable while minimizing extraneous disturbances to the passage of electric energy introduced by flexing of the cable.

Preferably, a porous, flexible insulating material 23 of a desired dielectric constant is disposed between the outer and inner conductors to provide insulated spaced relations between the conductors. Adhesive means are provided for securing the conductors in their relative positions. In order to maintain the proper conductor spacing laterally, a less porous insulating material 24 may be used either as a base or to fully encapsulate the conductors prior to lamination of the inner and outer conductors into an integral transmission line.

One of the unique features of the transmission line of FIG. 1 is the "corrugated" ground planes. Effectively, the spacing between the outer conductors is periodically varied. This is a radical departure from any of the teachings in the strip line art. Because of the inherent balance of the ideal strip line configuration the fields above and below a central plane through the line are equal and opposite. No parallel plate TEM, or TEO modes exist as long as the symmetry of such structure is maintained. In the ordinary flap-strip line, however, longitudinal tilting of the center strip between the ground planes excites higher order modes. Tilting may arise under pressure or any condition which separates the ground planes. In view of such teachings of the prior art, it appears obvious that any kink or indentation in the ground planes would produce a serious impedance discontinuity. In the instant embodiment, however, the indentations in the ground planes do not, in fact, appear as impedance discontinuities because of the relatively close positioning from indentation to indentation. In the transmission line of the present invention the indentations in the ground planes are preferably positioned at intervals of less than ¼ wavelength at the highest operating frequency of the line.

Another unique feature of this embodiment is the character of the "quilting" or crimping of the shields or ground planes so that there is some slack built into each shield. Here the cross-section of the cable is "loosened up" by employing a compressible, elastic, porous, insulating material 23 to occupy the space between the inner and outer conductors. This makes it possible for stretching to occur in the outer layer around a bend and compression to occur in the inner layer. Unless this can occur, serious changes in electric properties accompany any deformation of the cable since the center conductor tends to crush the dielectric and move out next to the outer ground plane while the inner ground plane buckles and separates widely from the center conductor. With indentations occurring, e.g. every half inch in the ground planes, the total deformation for each narrowed cross section would not exceed about 5° while bending the cable around a 6″ radius, i.e. the angles of the polygon formed by wrapping the cable around a cylinder of 6″ radius would be less than 5°. Furthermore, the indentations operate to locate the center conductor accurately in the center between the ground planes and operate to maintain the overall thickness of the cable by tying the ground planes together. The overall thickness of the transmission line must be controlled since it should not exceed ½ wavelength at the highest operating frequency of the line to avoid waveguide modes of propagation. This limitation is indicated in FIG. 2.

Yet another feature of the instant embodiment is the fact that the indentations in the upper and lower ground planes are offset with respect to each other, that is to say, they fall along lines in different planes laterally perpendicular to the transmission line. This feature not only provides increased flexibility but it enables a closer overall spacing of the indentations which, in turn, enables the transmission line to operate at higher frequencies without "seeing" the indentations as discontinuities, as would be the case if the indentations of the upper and lower ground planes were in the same lateral planes perpendicular to the transmission line.

Figure 4:
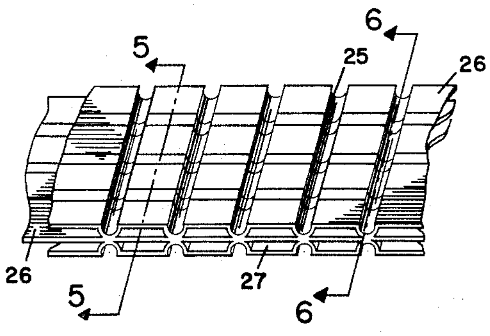
FIG. 4 is a perspective view of a modification of the embodiment in FIG. 1.
Figure 5:
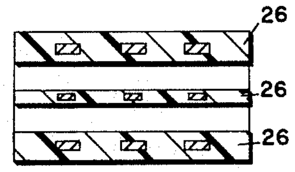
FIG. 5 is an elevational section of the transmission line of FIG. 4 taken along the line 5—5.
Figure 6:
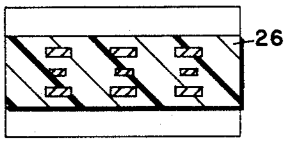
FIG. 6 is an elevational section of the transmission line of FIG. 4 taken along the line 6—6.

Referring now to FIG. 4 of the drawings there is here shown another embodiment of the transmission line of the present invention in which indentations 25 in the outer conductors fall in the same plane laterally perpendicular to the transmission line. By encapsulating the inner and outer conductors in a relatively non-porous, thermoplastic insulation 26 the outer and inner conductors may be bonded together at the indentations 25. This results in a structure having air gaps 27, thereby providing a transmission line with the dielectric constant of the separating material approaching that of air. Such a feature is desirable for certain applications.

As in the embodiment of FIG. 1 this embodiment is characterized by the fact that the indentations occur at space intervals less than ¼ wavelength at the highest operating frequency of the transmission line. In addition to providing predetermined points at which the transmission line will flex, the indentations also serve the function of providing extra conductor length for a given length of transmission line, thereby permitting conductors on the outside of a bend to stretch. This inhibits a sharp buckling at any particular point.

Figure 7:
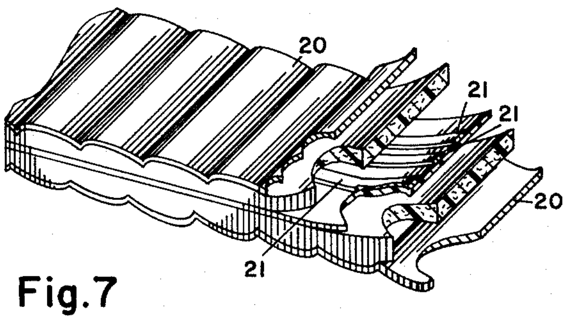
FIG. 7 is a perspective view, partly exploded and partly in section, of another modification of the embodiment of FIG. 1.
Figure 8:
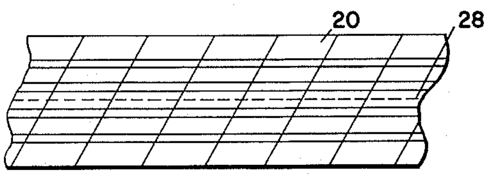
FIG. 8 is a plan view of an additional modification of the embodiment of FIG. 1.

Illustrated in FIGS. 7 and 8 are two modifications of the embodiment of FIG. 1. In FIG. 7 there is shown a transmission line having a plurality of signal potential conductors 21 with a common pair of ground planes 20. FIG. 8, on the other hand, illustrates an embodiment having ground planes 20 "corrugated" at an angle with respect to the lateral axis of the cable. An additional feature of the embodiment of FIG. 8 is that the conductors are secured in their relative positions by means of the stitching 28 indicated by the dashed line.

Figure 9:
FIG. 9 is a sectional elevation of an embodiment of an electric cable of the present invention.
Figure 10:
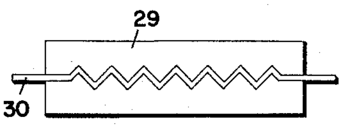
FIG. 10 is an elevational view of a modification of the embodiment of the cable in FIG. 9.
Figure 11:
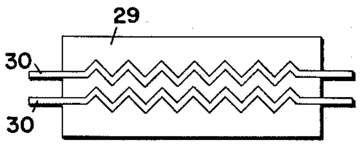
FIG. 11 is an elevational view of a further modification of the embodiment of the cable in FIG. 9.

Referring now to FIGS. 9–11 there are here illustrated embodiments of simple electric cables made in accordance with the principles of the present invention. (As used herein the term "cable" includes but is not limited to an insulated conductor for transmitting a current.) In the embodiment of FIG. 9 there is illustrated an elongated matrix 29 of flexible, elastic, insulating material and an elongated, flexible, partially non-linear, extensible conductor 30 embedded in and bonded at least in part to the matrix 29. The bonded conductor part is sufficiently longer than the matrix 29 between selected points along the cable to enable flexing of the cable by an extension of the extensible conductor 30 and a stretching of the elastic matrix 29. (What is meant by "elastic insulating material" is an insulating material capable of being readily stretched or expanded and of returning to its original dimensions without essential alteration. It is intended to include materials which are relatively supple rather than structural materials such as steel.) The embodiment of FIG. 10 is somewhat similar to that of FIG. 9 except that the conductor 30 is fully encapsulated and suspended in the elongated matrix 29 of flexible elastic insulating material. FIG. 11 illustrates a twin lead embodiment similar to the embodiment of FIG. 10. In each of these embodiments, between two selected points along the cable, the conductor is longer than its surounding insulation. Since the insulation is elastic, it will stretch with an elongation of the conductor, thus providing a cable which is not only flexible but stretchable.

While applicant does not intend to be limited to the use of any particular materials in the manufacture of the transmission lines of the present invention, the combination of copper conductors with polyvinyl chloride, insulation has been found to be particularly useful. For example, in the transmission line of FIG. 1 the ground plane conductors may be 2 oz. copper (0.0027" thick by 10 mils (0.010")) wide. Separation between adjacent ground planes conductors 20 may be, for example 0.005". The inner conductors 21 are 0.008" thick by 0.025" wide and are spaced apart ⅛". The porous resilient insulating material 23 separating the ground plane conductors 20 and the inner conductors 21 is, for example, polyurethane form. In the case of FIG. 4, the same conductor materials and dimensions may be employed and the plastic insulating material may be, for example, polyvinyl chloride. To improve the appearance of the transmission line of the present invention and to secure a better bond to the plastic insulating material, the copper conductors may have a black cupric oxide coating. This coating may be produced anodically or by means of a chemical bath. Such processes are fully described in the Meyer U.S. Patent No. 2,364,993 and Hurd U.S. Patent No. 2,828,250. The embodiments of FIGS. 9–11 may employ a 2 oz. copper foil ribbon for the conductor material and the matrix of insulating material may be an elastomer such as, for example, neoprene rubber. Other plastic materials that have successfully been employed to produce the article of this invention include polyethylene, polytetrafluoroethylene, polytrifluorochloroethylene, polyvinyl acetate and for the resilient porous material vinyl foams. It is believed, however, that this principle applies broadly to all plastics and conducting materials and applicant does not intend to be limited to those cited in the examples.

To illustrate more completely the methods and types of material that may be used to manufacture the transmission lines of this invention there follows an example of a method of manufacturing the transmission line illustrated in FIG. 1.

Figure 12:
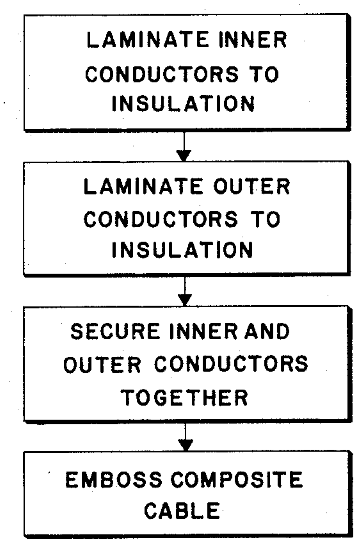
FIG. 12 is a flow chart illustrating a method of manufacturing an embodiment of the transmission line of the present invention.
Figure 13:
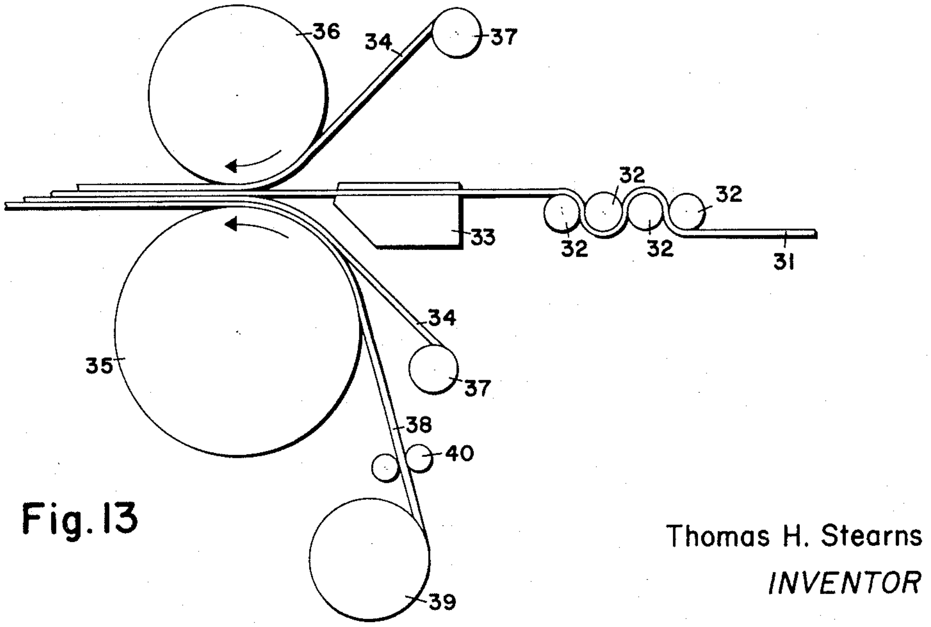
FIG. 13 is a schematic diagram illustrating a method of laminating transmission line conductors between sheets of insulating material.
Figure 14:
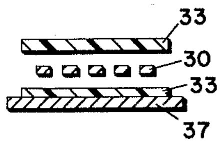
FIG. 14 is an elevational section of transmission line conductors, insulation and carrier sheet positions immediately prior to lamination.

Referring now to FIG. 12 a flow chart for a method of manufacturing a flexible transmission line is illustrated. The method is carried out in detail in the following manner:

(1) Laminate the inner conductors between layers of flexible insulating plastic. The details of this step are better illustrated by reference to FIGS. 13 and 14. There is here shown a plurality of conductors 31 which are fed through a series of bridle rolls 32 to put the conductors 31 under tension. If the conductors are, for example, 8 mils by 25 mils and the bridle rolls 32 have, for example, a ½" diameter, a tension of 2–3 pounds per strand may readily be achieved. The conductors 31 are then passed through a guide block 33 where the desired conductor separation is accurately governed. The guide block 33 is preferably heated so that it is not necessary to heat both the conductors 31 and plastic insulation 34 during the laminating step. This enables faster lamination than would be possible otherwise, since the conductors 31 tend to act as a heat sink. Before entering the laminating rolls 35 and 36, the conductors 31 are fed between thin sheets of insulating materials 34. The insulating material 34 is dispensed from spools 37. Lamination takes place between a hot roll 35 and a cold roll 36. So that the insulating material will not stick to the heated roll 35, it is conducted through the rolls 35 and 36 on a transfer belt 38 which, for example, may be aluminum foil. The transfer belt material 38 is then fed continuously from a spool or roll 39. The tension of the transfer belt may be regulated or tuned by means of a tension brake 40. This tension must be carefully tuned so as not to cause a buckling of the insulation 34 due to a difference in tension between the transfer belt 38 and the conductors 31. The parameters which must be considered in tuning the tension of the transfer belt are the temperature of the heated roll 35, the speed of rotation of the rolls 35 and 36, and the tension in the conductors 31. FIG. 14 illustrates in cross section the positions of the transfer belt 38, conductors 31, and layers of insulation 34 just prior to entering the laminating rolls 35 and 36.

(2) The outer conductors may be laminated to a base of thermoplastic insulation in a manner similar to that of the inner conductors 31, however, it is not necessary in the case of either the inner or outer conductors to laminate the conductors between layers of insulation. It is quite as satisfactory simply to laminate the conductors to a base layer of insulation only, since the function of the insulation is merely to hold the conductors in their relative positions.

Figure 15:
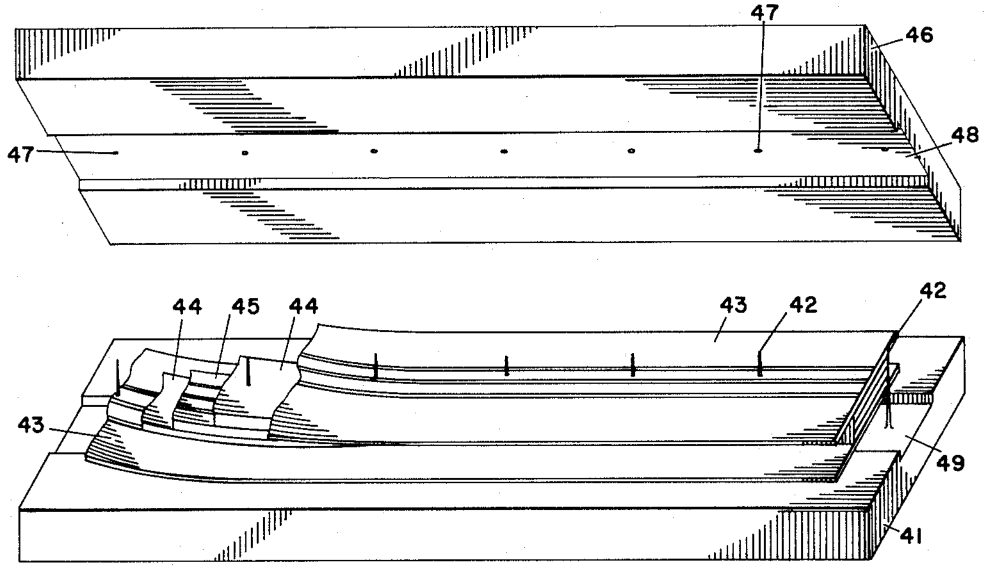
FIG. 15 is a perspective view of a partially fabricated transmission line of the present invention illustrating its structure prior to pressing and sealing.

(3) After the inner conductors and outer conductors are bonded to sheets of insulating material they are assembled on a lower press plate 41 as illustrated in FIG. 15. The lower press plate 41 has a row of pins 42 normal to the surface of the plate. The composite cable is then assembled by positioning the various layers on the pins 42. For example, a layer of outer conductors 43 is placed on the pins. On top of this is placed a porous resilient insulating layer 44 as, for example, polyurethane foam. Following this, the layer of inner conductors 45 is placed on the pins and centered relative to the first layer of outer conductors. This is followed by another layer of porous resilient insulating material 44. Finally, the second layer of outer conductors 43 is also placed on the pins and centered relative to the layer of inner conductors and first layer of outer conductors. The upper press plate 46 has apertures 47 therein to receive the pins 42 when placed in registry therewith. Both the upper press plate 46 and lower press plate 41 have troughs or recesses, 48 and 49 respectively, for accommodating that portion of the transmission line having conductors therein. It is desirable at this point to have the insulating material carrying the outer conductor layers 43 wider than the intended width of the transmission line. The purpose of this is so that the upper and lower press plates will firmly seal the outer edges of the transmission line without excessively compressing that portion of the transmission line carrying the conductors. This forms a bag-like structure that permits the resilient dielectric layers 44 to expand and compress when subjected to strain. After the sealing has been completed the excess plastic may be trimmed off the edges of the cable leaving only a small longitudinal sealed area. The purpose of the pressing operation is solely to secure the conductors and dielectric in their relative positions. An alternative method of accomplishing the same result would be to sew the conductor and dielectric layers in position with a non-conductive thread such as nylon. This would produce an embodiment like that illustrated in FIG. 8.

Figure 16:
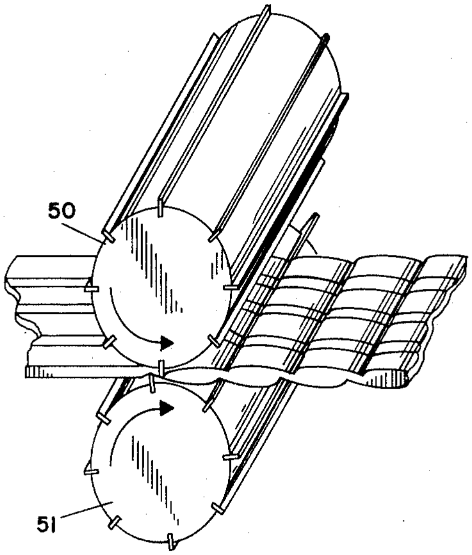
FIG. 16 is a perspective view of a transmission line of the present invention illustrating indentation of the outer conductors by means of embossing rolls.

(4) When the processing in accordance with step 3 is completed, the transmission line is then periodically indented by means of embossing rolls 50 and 51 as more particularly illustrated in FIG. 16. This procedure wedges the outer conductors toward the inner conductors without materially affecting the inner conductors themselves due to the resilience of the dielectric spacing material. As mentioned above, the indentations provide an extra length of conductor per unit length of cable, thus permitting the conductors to stretch when the cable is flexed.

The present invention presents an important step forward in the art of transmission lines in that the dielectric and flexibility properties of various plastic materials may be successfully utilized to achieve a heretofore unrealized result in the manufacture of transmission lines.

While there have been described what are at present considered to be the preferred embodiments of this invention, it will be obvious to those skilled in the art that various changes and modifications may be made therein without departing from the invention and it is, therefore, aimed in the appended claims to cover all such changes and modifications as fall within the true spirit and scope of the invention.

What is claimed is:

1. A flexible, planar high frequency transmission line, comprising: a pair of substantially parallel, flexible, elongated, planar, continuous, solid extensible outer members containing a plurality of conductors providing ground planes; an elongated, solid planar, flexible signal potential inner member containing a plurality of inner conductors disposed in insulated spaced aligned relation between said outer conductors to provide a plurality of transmission lines, the spacing between said outer members being periodically varied to provide increased flexibility of said cable, said periodic variations being so spaced as to minimize extraneous disturbances to the passage of high frequency electric energy therethrough; and flexible insulating material disposed between said members to provide means for securing said members in their relative positions.

2. A flexible, planar high frequency transmission line, comprising: a pair of substantially parallel, flexible elongated, planar, continuous, solid extensible outer members containing a plurality of conductors providing ground planes; an elongated, solid planar, flexible signal potential inner member containing a plurality of inner conductors narrower than said outer conductors, disposed in insulated spaced aligned relation between said outer conductors to provide a plurality of transmission lines, the spacing between said outer members being periodically varied to provide increased flexibility of said cable, said periodic variations being so spaced as to minimize extraneous disturbances to the passage of high frequency electric energy therethrough; and flexible insulating material disposed between said members to provide means for securing said members in their relative positions.

3. A flexible, planar high frequency transmission line, comprising: a pair of substantially parallel, flexible, elongated, planar, continuous, solid extensible outer members containing a plurality of conductors providing ground planes; an elongated, solid planar, flexible signal potential inner members containing a plurality of inner conductors narrower than said outer conductors disposed in insulated spaced aligned relation between said outer conductors to provide a plurality of transmission lines, the spacing between said outer members being periodically varied at predetermined intervals less than ¼ wavelength at the highest operating frequency to provide increased flexibility of said cable, while minimizing extraneous disturbances to the passage of electric energy introduced by flexing of said cable; and flexible insulating material disposed between said members to provide means for securing said members in their relative positions.

4. A flexible, planar electric cable, comprising: a pair of substantially parallel, flexible, elongated, planar, continuous, solid, extensible outer conductors providing ground planes; an elongated, solid planar, flexible signal potential inner conductor narrower than said outer conductors disposed in insulated spaced relation between said outer conductors, the spacing between said outer conductors and said inner conductor being periodically varied by means of indentations alternately in each of said outer conductors along lines falling in different planes laterally perpendicular to said cable to provide increased flexibility of said cable, said periodic variations being so spaced as to minimize extraneous disturbances to the passage of high frequency electric energy therethrough; and flexible insulating material disposed between said conductors to provide means for securing said conductors in their relative positions.

5. A flexible, planar high frequency transmission line, comprising: a pair of substantially parallel, flexible, elongated, planar, continuous, solid, extensible outer conductors providing ground planes; an elongated, solid planar, flexible signal potential inner conductor narrower than said outer conductors disposed in insulated spaced relation between said outer conductors, the spacing between said outer conductors and said inner conductor being periodically varied by means of indentations in said outer conductors such that no two indentations occur in a plane laterally perpendicular to said cable, yet are spaced longitudinally less than ¼ wavelength at the highest operating frequency to provide increased flexibility of said cable, while minimizing extraneous disturbances to the passage of electric energy introduced by flexing of said cable; and flexible insulating material disposed between said conductors to provide means for securing said conductors in their relative positions.

6. A flexible, planar high frequency transmission line, comprising: a pair of substantially parallel, flexible, elongated, planar, continuous, solid, extensible outer conductors providing ground planes; an elongated, solid planar, flexible signal potential inner conductor disposed in insulated spaced relation between said outer conductors, the spacing between said outer and inner conductors being periodically varied by means of indentations in the outer conductors to provide increased flexibility of said cable, said indentations falling in alternate planes laterally perpendicular to said cable, said periodic indentations being so spaced as to minimize extraneous disturbances to the passage of high frequency electric energy therethrough; and flexible insulating material having air entrapped therein, disposed between said conductors to provide means for securing said conductors in their relative positions.

7. A flexible planar high frequency transmission line comprising a pair of substantially parallel flexible elongated outer members each containing at least one conductor providing a ground plane, an elongated planar flexible signal potential inner member containing a plurality of inner conductors disposed in insulated spaced relation between said outer members, a plurality of spaced lateral indentations in each of said outer members, said indentations being spaced so as to minimize extraneous disturbances to the passage of electrical energy therethrough and to increase the flexibility of said transmission line, and flexible insulating material disposed between said outer members to provide means for securing said outer members and said inner member in their relative positions.

References Cited in the file of this patent

UNITED STATES PATENTS

| | | |
|---|---|---|
| 19,116 | Absterdam | Jan. 19, 1858 |
| 2,348,641 | Parker | May 9, 1944 |
| 2,751,561 | King | June 19, 1956 |
| 2,785,382 | Lamb | Mar. 12, 1957 |